United States Patent [19]

Carlson et al.

[11] Patent Number: 4,569,150
[45] Date of Patent: Feb. 11, 1986

[54] METHOD AND APPARATUS FOR OPTIMIZATION OF GROWTH OF PLANTS

[75] Inventors: William H. Carlson, Okemos; Royal D. Heins, DeWitt, both of Mich.

[73] Assignee: Board of Trustees operating Michigan State University, East Lansing, Mich.

[21] Appl. No.: 547,208

[22] Filed: Oct. 31, 1983

[51] Int. Cl.[4] .......................... B01F 3/02; A01G 9/00
[52] U.S. Cl. ............................................. 47/17; 47/58
[58] Field of Search ............................ 47/1, 17, 58, 59

[56] References Cited

U.S. PATENT DOCUMENTS

| | | | |
|---|---|---|---|
| 3,063,195 | 11/1962 | Ravich | 47/17 |
| 3,398,481 | 8/1968 | Lake | 47/17 X |
| 4,339,074 | 7/1982 | Nissmo et al. | 47/17 X |
| 4,430,828 | 2/1984 | Oglevee et al. | 47/17 |

FOREIGN PATENT DOCUMENTS

| | | | |
|---|---|---|---|
| 2235629 | 2/1975 | France | 47/17 |
| 1143403 | 2/1969 | United Kingdom | 47/17 |
| 1199278 | 7/1970 | United Kingdom | 47/17 |
| 2037554 | 7/1980 | United Kingdom | 47/17 |

OTHER PUBLICATIONS

Laurie, Alex et al., "Temperature Coefficient"; Night and Day Temperatures (from Chapt. 10, The Control of Environmental Factors Influencing Plant Growth), Commercial Flower Forcing, McGraw-Hill, Inc. (1969), p. 93.
Rathmell, J. K., "Danish Firm Uses Solar Energy for Greenhouse Climate Control", Florists' Review, vol. 155 (1/1975), pp. 21–22.
Strain, J. R. (1983), "Computer Possibilities for Wholesalers, Retailers and Growers", Florists' Review, pp. 37, 38, 40 and 41, 3-24-83 (vol. and No. unknown).
Carro, F. I., (1981), "Control de Invernaderos con Computador: cultivos hidroponicos", Mundo Electronico, 1981, No. 113, pp. 59–66.
Takakura, T. et al. (1974), "Direct Digital Control of Plant Growth-I. Design and Operation of the System", Transactions of the ASAE, vol. 17, No. 6, pp. 1150–1154.
Smith, J. R. (1981), "Know Your Requirements", Grower, Jul. 1981, pp. 13, 15 and 16.
Upadhyaya, S. K. (1981) (Report) "Effect of $CO_2$ Enrichment on Greenhouse Crop Production", 1981 Winter Meeting of the ASAE, paper No. 81-4524.
Armitage, A. M., Ph.D. thesis, Department of Horticulture, Michigan State University (1980).
Erickson et al., Hort. Science 15:815–817 (1980).
Armitage, A. M. et al., J. American Soc. Hort. Science, 106;632–638; 643–647 (1981).
Gardiner et al., The Response Surface Method as a Biological Research Tool, Tenn. Agric. Expt. Sta. Bul. 429 (1967).

Primary Examiner—James R. Feyrer
Attorney, Agent, or Firm—Ian C. McLeod

[57] ABSTRACT

A method and apparatus for increasing the growth of plants (24) in a greenhouse (12, 13) or other protected area is described. The method and apparatus regulates the amount of carbon dioxide to which the plants are exposed and the temperature of the atmosphere as a function of the amount of light in a pre-selected temperature range and vents the greenhouse to outside air above the temperature range. The method preferably uses a computer (10) and microprocessor (11) for detection, analysis and adjustment of the growth variables.

21 Claims, 5 Drawing Figures

METHOD AND APPARATUS FOR OPTIMIZATION OF GROWTH OF PLANTS

BACKGROUND OF THE INVENTION (1) Field of the Invention

The present invention relates to an improved method for growing plants in a controlled environment, such as a greenhouse with light transmitting windows. In particular, the present invention relates to control of the amount of carbon dioxide to which the plants are exposed and the temperature of the greenhouse as a function of the light received by the plants.

(2) Prior Art

The prior art has described light and temperature and their affect on plant growth. Illustrative are a Ph.D. thesis by Armitage, A. M., Department of Horticulture, Michigan State University (1980); Erickson et al, *Hort. Science* 15, 815–817 (1980); and Armitage, A. M. et al J. American Soc. Hort. Science 106, 632–638; 643–647 (1981). So far as applicants are aware, control of carbon dioxide and temperature as a function of the light available to the plants to improve the rate of growth has not been described.

OBJECTS

It is therefore an object of the present invention to increase the rate growth of plants by means of carbon dioxide and temperature control as a function of the light available to the plants in a greenhouse. Further it is an object of the present invention to provide a method which is relatively economical, in that plants are brought to maturity in a shorter period of time and/or with higher plant quality. These and other objects will become increasingly apparent by reference to the following description and the drawings.

IN THE DRAWINGS

GENERAL DESCRIPTION

Figure 1:
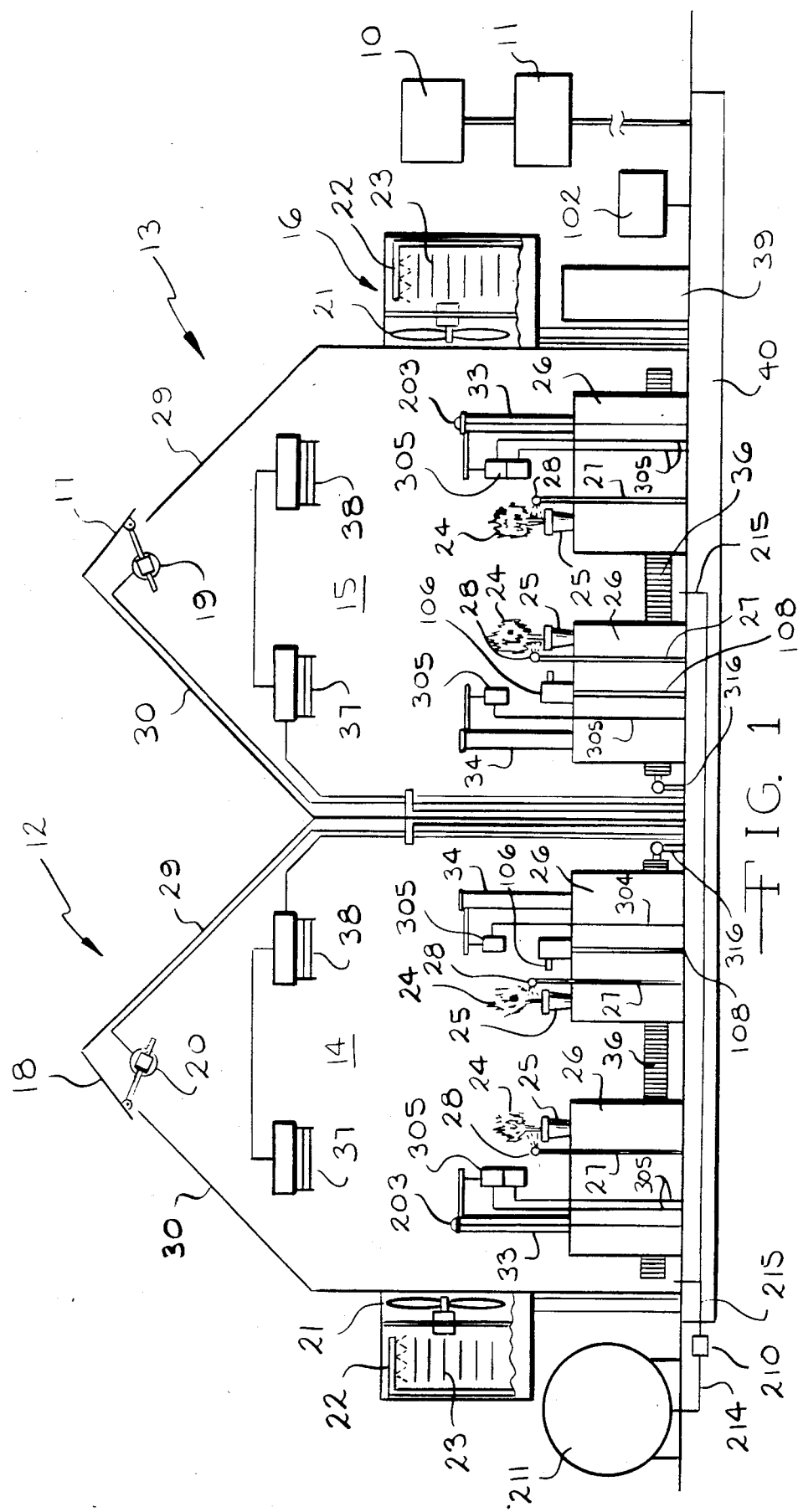
FIG. 1 is a schematic view showing two greenhouses (12, 13) providing control of carbon dioxide and temperature levels in an atmosphere (14, 15) as a function of plant exposure to light.

The present invention relates to method for the optimization of growth of plants (24) in a greenhouse or other protected area (12, 13) which comprises:

(a) providing the greenhouse including windows (29, 30) or other means which allows sunlight or artificial light exposure on the plants and including vent means (17, 18, 19, 20) for venting the greenhouse to outside air for cooling of an atmosphere (14, 15) in the greenhouse, a heater means (36) for heating the atmosphere, and a dispensing means (211) for providing an increased amount of carbon dioxide in the atmosphere in the greenhouse, wherein the vent means, heater means, and the dispensing means are controlled as a function of a measured amount of light in the greenhouse; and (b) regulating the temperature of the atmosphere and the amount of carbon dioxide in the atmosphere as a function of the measured amount of light at a pre-selected atmosphere temperature range in the greenhouse and venting the greenhouse to outside air with the vent means at atmosphere temperatures in the greenhouse above the pre-selected temperature range in day and night cycles until the plant matures.

The present invention particularly relates to a method for the optimization of growth of plants (24) in a greenhouse (12, 13) or other protected area which comprises:

(a) providing the greenhouse including windows (29, 30) or other means which allows sunlight or artificial light exposure on the plants including vent means (17, 18, 19, 20) for venting the greenhouse to outside air for cooling of an atmosphere (14, 15) in the greenhouse, a heater means (36) for heating the atmosphere and a dispensing means (211, 215) for providing an increased amount of carbon dioxide in the atmosphere in the greenhouse, wherein the vent means, the heater means and the dispensing means are controlled as a function of a measured amount of light in the greenhouse; and (b) regulating the temperature of the atmosphere with the vent means and the heater means and the amount of carbon dioxide with the dispending means as a function of a pre-selected atmosphere temperature between about 1° C. and 35° C. according to the equations written in BASIC computer language:

$$C = ((((J*B) + (J*H*L))/(2*F)) - D - (I*L))/((2*G) - ((J*J)/(2*F)))$$

$$T = (-B - (H*L) - (J*C))/(2*F)$$

wherein * stands for multiplication, wherein C and L are in log form to the base 10 and the concentration of carbon dioxide (C) is in parts per million and the temperature (T) is in °C. and where L is light in mol sec$^{-1}$ meter$^{-2}$ in the 400–700 nanometer waveband wherein B, D, F, G, H, I and J are: experimentally derived values in the following ranges B: −8.14 to −1.44
D: 32.15 to 96.45
F: −0.48 to −0.04
G: −29.88 to 18.39
H: 0.45 to 2.58
I: 3.26 to 22.85
J: 1.16 to 1.95 and venting the greenhouse for cooling above the pre-selected temperature range in day and night cycles until the plants mature. Obviously the programs could be written in another computer language.

The present invention also relates to an apparatus for optimization of the growth of plants (24) which comprises:

(a) a greenhouse (12, 13) including windows (29, 30) which allow ambient light exposure on plants and including automatically controlled vent means (17, 18, 19, 20) for venting and thus cooling an atmosphere (14, 15) in the greenhouse with outside air;

(b) automatically controlled heater means (36) which increases the temperature of the atmosphere in the greenhouse;

(c) automatically controlled dispensing means (211) leading into the greenhouse for providing carbon dioxide in the atmosphere in the greenhouse;

(d) light, temperature and carbon dioxide sensing means (203, 305, 106) for measuring an amount of light falling on the plants and for measuring the temperature and amount of carbon dioxide in the greenhouse; and (e) control means connected to the vent means, dispersing means and heater means which automatically regulates the temperature of the atmosphere and the amount of carbon dioxide in the atmosphere as a function of the amount of light at a pre-selected temperature range of the atmosphere and which vents the greenhouse to outside air at temperatures above the pre-selected temperature range in day and night cycles until the plant matures.

The basic approach to development of the present invention was as follows:
(I) Selection of a statistical approach and experimental design.
(II) Experimentation.
(III) Analysis of data using regression analysis to develop equations.
(IV) Validation of the equations by growing plants using the equations as part of the control strategy.

I. Selection of a statistical approach and experimental design

The overall objective is to develop regression equations based on collected data. Traditional experimental design to evaluate the effect of several variables on some factor (e.g. photosynthesis) is to conduct a factorial experiment.

An example would be to evaluate the effect of light, temperature, and carbon dioxide concentration on photosynthetic rate. Using five levels of each factor, one would have 5×5×5 or 125 treatment combinations. While this approach will provide data to develop regression equations, it is a very time consuming process to collect data on all 125 treatment combinations.

A more efficient method is to use a central composite design. The design only requires $2^x + 2x + 1$ treatments for X factors. For the example described above of three factors, the treatment combinations are reduced to 15. Treatment values are selected based on the points shown in the three dimensional factor space. The procedure is described in Gardiner et al, The response surface method as a biological research tool. Tenn. Agric. Expt. Sta. Bul. 429 (1967).

The key point in the experimental design is to be certain the treatment combinations cover the region of interest. In addition, the range of values must not result in lethal combinations and they must be of the proper magnitude so the equation chosen has a reasonable chance of describing the response.

II. Experimentation

Once the experimental design and treatment combinations have been selected, collection of data depends on execution of the treatment combinations with appropriate equipment to make the desired measurements. In the examples, plants were exposed to the various light, temperature, and carbon dioxide concentrations and photosynthesis measured. Measurement can be on a single leaf or whole plant basis and can be made with any standard photosynthesis measuring techniques, such as $^{14}CO_2$ pulsing or differential $CO_2$ analysis. Rates are then calculated and expressed on a standard basis such as leaf area.

Measurements of dry weight, plant height, leaf area, time to flower, etc. are made depending on the experiment's objective.

III. Analysis of data using regression analysis to develop equations

For a model to be useful, raw data must be reduced into mathematical equations. Various statistical packages are available on most mainframe computers which allow one to easily calculate the equation coefficients once the equation form is decided. A step-wise procedure evaluating 1st order, 2nd order, 3rd order, etc. equations can be easily conducted to determine which equation form most readily fits the data. Standard statistical F-tests of significance are used in the evaluation.

An example of 2nd order equation for 3 factors would be as follows:

$$Y = B_0 + B_1X_1 + B_2X_2 + B_3X_3 + B_{11}X^2_1 + B_{22}X_2^2 + B_{33}X_3^2 + B_{12}X_1X_2 + B_{13}X_1X_3 + B_{23}X_2X_3$$

This equation could be used directly to predict a response or partial derivatives with respect to each factor could be calculated and used to calculate optimum conditions.

IV. Validation of the equations

Completion of step III gives one the equations for a model. However, unless the equations are validated, one has no idea if they are an improvement over current knowledge.

Experiments must be conducted where plants are grown using the equations as a basis of control or alternatively, the environmental conditions can be closely monitored in a group of plants. The data are then fed into the equations to determine if they accurately predict the observed response. Accurate prediction or improved growth support the equation's validity and vice versa.

If the equations are inadequate or if improved or expanded prediction is desired, one must repeat the above-described process starting at I.

Background Information on the Photosynthesis Optimization Model (A) Experimental design and procedure-Central Rotatable Design for Photosynthetic Modeling in Chrysanthemum

| Variables | |
|---|---|
| $CO_2$ | 300–2000 ppm [2.477–3.301 (log base 10)] |
| Light | 100–2000 micromol · Sec$^{-1}$ meter$^{-2}$[2–3.301 (log base 10)] wherein log Base 10 are the values converted to logarithmic numbers[b] |
| Temperature | 55 (13)–85 (30) °F. (°C.) |

| Design Values for Photosynthetic Modeling | | | | | |
|---|---|---|---|---|---|
| Design values (mol Sec$^{-1}$ Meter$^{-2}$) | | | Light | Temperature °F. (°C.) | $CO_2$ (ppm) |
| 0 | 0 | 0 | 450 | 70 (21) | 775 |
| −1 | −1 | −1 | 180 | 61 (16) | 440 |
| 1 | −1 | −1 | 1090 | 61 (16) | 440 |
| −1 | 1 | −1 | 180 | 79 (26) | 440 |
| 1 | 1 | −1 | 1090 | 79 (26) | 440 |
| −1 | −1 | 1 | 180 | 61 (16) | 1360 |
| 1 | −1 | 1 | 1090 | 61 (16) | 1360 |
| −1 | 1 | 1 | 180 | 79 (26) | 1360 |
| 1 | 1 | 1 | 1090 | 79 (26) | 1360 |
| −1.682 | 0 | 0 | 100 | 70 (21) | 775 |
| 1.682 | 0 | 0 | 2000 | 70 (21) | 775 |
| 0 | −1.682 | 0 | 450 | 55 (13) | 775 |
| 0 | 1.682 | 0 | 450 | 85 (29) | 775 |
| 0 | 0 | −1.682 | 450 | 70 (21) | 300 |

-continued

| 0 | 0 | 1.682 | 450 | 70 (21) | 2000 |

(B) Statistical Analysis

The following regression equation written in BASIC was calculated from the data.

$$PN = (A*L) = (B*T) + (D*C) + (E*L*L) + (F*T*T) + (G*C*C) + (H*L*T) + (I*L*C) + (J*T*C) + K$$

Where

L = Light (log transformed and is in micromol sec$^{-1}$ meter$^{-2}$ and 400–700 nanometer waveband)
T = Temperature (°C.)
C = $CO_2$ Concentration (log transformed and in ppm)

and

Preferred Constants

A = −23.94
B = −4.79
D = 64.30
E = −4.83
F = −0.079
G = −22.98
H = 1.52
I = 13.06
J = 1.56
K = −21.92

(C) Development of equations to calculate optimum light and temperature values

1. To find the temperature which gives the maximum photosynthetic rate for any light intensity and $CO_2$ concentration, the partial derivative of the PN equation with respect to temperature is calculated and set to zero $$B + (2*F*T) + (H*L) + (J*C) = 0 \quad (1)$$

Solving for T, one obtains the following equation:

$$T = -(B + (H*L) + (J*C))/(2*F) \quad (2)$$

2. Similarly, one can solve for $CO_2$ and light. The equations are $$L = -(A + (H*T) + (I*C))/(2*E) \quad (3)$$

$$C = -(D + (I*L) + (J*T))/(2*G) \quad (4)$$

3. Substitution allows one to calculate the optimum $CO_2$ concentration at a particular light level where:

$$C = ((((J*B) + (J*H*L))/(2*F)) - D - (I*L))/((2*G) - ((J*J)/(2*F))) \quad (5)$$

and substituting the optimum $CO_2$ value into the temperature maxima equation (2), we have $$T = (-B - (H*L) - (J*C))/(2*F) \quad (6)$$

C and L in equation (5) and (6) are in log form.

(D) Experimental validation of the equations

Plants were grown in the greenhouses of FIGS. 2 to 5 where the environment (temperature and $CO_2$ concentration) were controlled by a microcomputer 10 as shown in FIG. 1 based on equations (5) and (6). They were compared with plants grown under typical commercial environmental conditions (16° Night/ 20° Day/ 24° Cool with ambient $CO_2$ levels. Dry weight accumulation in the plants is shown in Table 1.

TABLE 1

Influence of standard environmental conditions and photosynthetically optimized conditions on dry weight accumulations in chrysanthemum 'Bright Golden Anne'.

| Experiment Treatment | Dry Weight (g) Shoot position[z] | | | | |
|---|---|---|---|---|---|
|  | 0 | 1 | 2 | 3 | Total |
| Optimized | 3.0 | 5.4 | 5.7 | 4.5 | 18.6 |
| Standard | 2.4 | 4.7 | 4.2 | 2.0 | 13.3 |

[z]0 - original mother shoot plus roots.
1 - apical flowering shoot on mother shoot.
3 - basal flowering shoot on mother shoot.

(E) Current status

Based on the positive results from the first experiments, six greenhouse sections were computerized. Plants were grown under one of three strategies:
(1) Traditional 16°N/20°D/24° vent
(2) Temperature optimized by equation (6), $CO_2$ at ambient levels
(3) Temperature optimized by equation (6), $CO_2$ optimized by equation (5).

Results from these experiments are listed below indicating the value of the equations.

| Planting Date | Total Plant Dry Weight (g) Treatment[z] | |
|---|---|---|
|  | S | OTC |
| 1/19/83 | 15.0 | 19.3 |
| 2/5/83 | 16.0 | 22.7 |
| 2/17/83 | 16.5 | 10.9 |

[z]Treatments - S is Standard commercial environmental conditions (16° C. Night/20° C. Day/24° C. Cool with ambient $CO_2$), OTC is optimized temperature and $CO_2$ based on equations (5) and (6).

Derivation of Optimum Temperature and $CO_2$ at any light $$PN = (A*L) + (B*T) + (D*C) + (E*L*L) + (F*T*T) + (G*C*C) + (H*L*T) + (I*L*C) + (J*T*C) + K$$

Partial derivatives for:

Light = $A + (2*E*L) + (H*T) + (I*C)$

Temp = $B + (2*F*T) + (H*L) + (J*C)$ $CO_2 = D + (2*G*C) + (I*L) + (J*T)$

Setting each partial to 0 (zero) and solving for light, temp, or $CO_2$.

$$L = -(A + (H*T) + (I*C))/(2*E)$$

$$T = -(B + (H*L) + (J*C))/(2*F)$$

$$C = -(D + (I*L) + (J*T))/(2*G)$$

To obtain maximum PN at any light, one first solves for optimum $CO_2$ by substituting the value of T into the $CO_2$ equation, i.e., $$C = -D - (I*L) - J\frac{(-B - (H*L) - J*C)}{(2*F)}$$

$$(2*G)$$

solving $$C(2*G) = -D - (I*L) + \frac{(J*B) + (J*H*L) + (J*J*C)}{(2*F)}$$

$$C(2*G) - \frac{(J*J*C)}{(2*F)} = -D - (I*L) + \frac{(J*B) + (J*H*L)}{(2*F)}$$

$$C\left((2*G) - \frac{J*J}{(2*F)}\right) = -D - (I*L) + \frac{(J*B) + (J*H*L)}{(2*F)}$$

$$C = \frac{-D - (I*L) + \frac{(J*B) + (J*H*L)}{(2*F)}}{(2*G) - \frac{(J*J)}{(2*F)}}$$

This calculated value of $CO_2$ is then substituted into the temperature equation and the optimum temperature is calculated at the particular $CO_2$ and light value, i.e., $$\text{temp} = \frac{(-B - (H*L) - (J*C))}{(2*F)}$$

Specific Description

FIG. 1 shows the complete system of the present invention. FIGS. 2 to 5 show various subcomponents as described in detail more fully hereinafter.

As shown the system included multiple greenhouses 12 and 13 of which two are shown controlled by a computer 10 (such as an Apple TM) and a 8073 TM microprocessor 11 sold by Oglevee Associates, Incorporated, Connellsville, Pa. It will be appreciated that any number of greenhouses can be controlled by the computer 10 assuming it is of sufficient computing capacity. The greenhouses 12 and 13 included atmospheres of sections 15 and 14 which contain the air and carbon dioxide for growth of plants 24. The greenhouses 12 and 13 are duplicates of each other.

The plants 24 were provided in pots 25 or other holding means on tables 26. The plants 24 were watered as required by tubes 27 and nozzles 28. Light radiated through windows 29 and 30. Light was sensed by sensors 203. The dry bulb and wet bulb temperatures were sensed by sensors 305. The sensors 203 and 305 were mounted on pedestals 33 and 34 on table 26. Air from the greenhouses 12 and 13 was sampled by pumps 106. Steam was supplied to radiators 36 through lines 316. Light was optionally supplied by fluorescent or high intensity discharge lamps 37 and 38. The greenhouses 12 and 13 were cooled by vents 17 and 18 controlled by motors 19 and 20 (only one shown in each greenhouse 12 and 13 for simplicity). Further cooling can be accomplished with fan 21 and spray nozzles 22 providing water on evaporation pads 23. Carbon dioxide was supplied from a pressured tank 211 via line 214 valve 210 and line 215 to greenhouses sections 14 and 15. Another carbon dioxide source such as burning of a hydrocarbon gas in air can also be used. A control panel 39 contained various mechanical relays and solid state relay cards and valves as discussed more fully hereinafter. The greenhouses 12 and 13 were mounted on a support 40 which contained the various lines and connectors for the systems described hereinafter. The computer 10 and microprocessor 11 as well as a carbon dioxide analyzer 203 (FIG. 2) were preferably housed in a separate air-conditioned room. The following is a description of the subcomponents of the system.

Heating System

Figure 3:
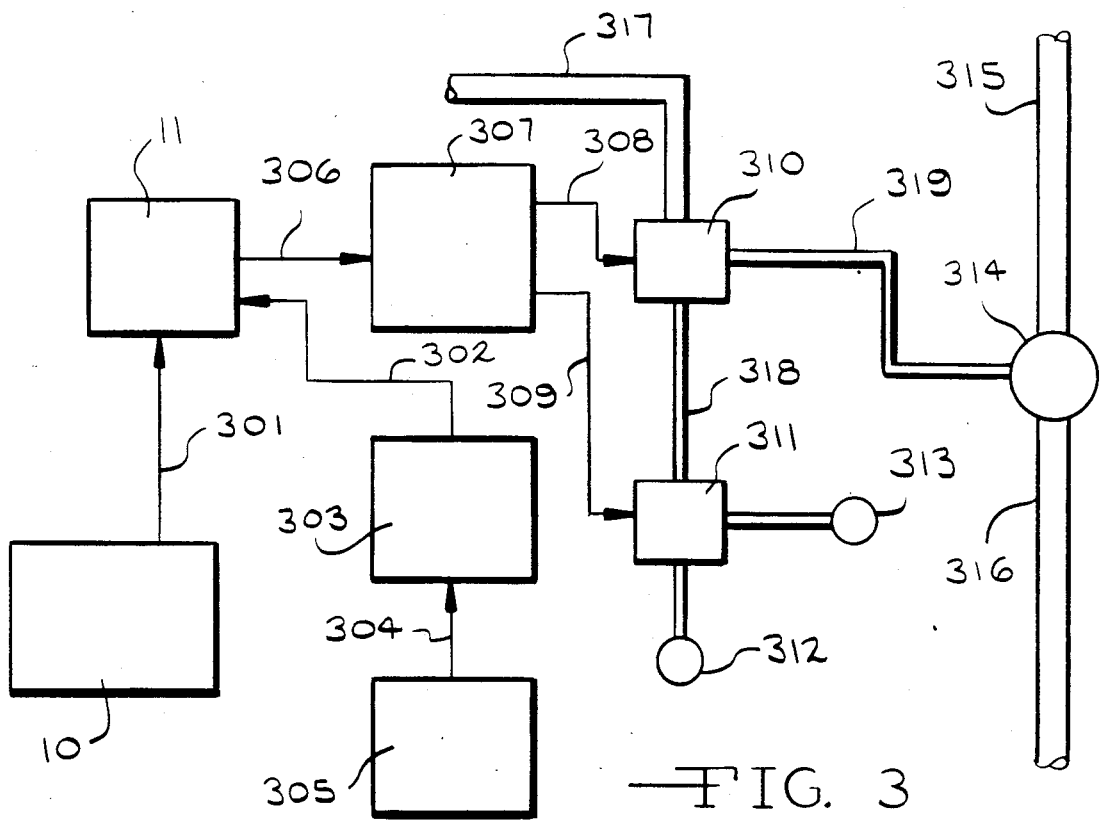
FIG. 3 is a schematic view of the heating system for each greenhouse.

As shown in FIG. 3, the heating system consisted of six major components. They included the microcomputer 10, the microprocessor 11, the MUX Card 303 which read temperature sensors 305, a TRIAX card 307 which was used to engage the three-way solenoids 310 and 311. A set-point temperature was transmitted from the microcomputer 10 to the microprocessor 11 via connnection 301. The microprocessor 11 read the MUX card 303 which read the temperature sensor. If the temperature in the greenhouse 12 or 13 section 14 or 15 was below the setpoint, the microprocessor 11 energized solid state relays in the TRIAX card 307 which were connected to three-way solenoids 310 and 311. The basic procedure for bleeding steam into the greenhouse heating system revolved around the two three-way solenoids 310 and 311.

Normally the pneumatic steam valve 314 in the steam line 315 was held closed by positive air pressure. To bleed steam into the greenhouse heaing radiators 36 via line 316, the pressure must be released from the pneumatic steam valve 314. Ordinarily, the pressure to the pneumatic steam valve would be controlled by a thermostat. In the present system, two three-way solenoids 310 and 311 were used to accomplish what the thermostat formally handled. In a pneumatic line 317 running from an air compressor (not shown) was placed one three-way solenoid valve 310. Off one of the open ports of valve 310, a second three-way solenoid 311 with manual bleed off valves 313 and needle valve 312 valve was connected via line 318. When both solenoids 310 and 311 were off, an open line ran from the pneumatic valve 314 through the first three-way solenoid 310 into the second three-way solenoid 311 to the manual bleed-off valve 313. When the first solenoid 310 was energized, pressurized air via line 317 from the compressor (not shown) shuts the pneumatic steam valve 314 via line 319. When the first solenoid 310 was then shut-off, the positive pressure remained because the manual bleed-off valve 313 was closed. When steam via line 316 was required in the greenhouse heating system, the second solenoid 311 was energized. When energized, air passed at a controlled rate through needle valve 312 which lowered the air pressure holding the pneumatic steam valve 314 shut. The amount of time that solenoid 311 was energized, controls the amount of air released by valve 312 and therefore the relative position of the pneumatic steam valve 314.

In the preferred system six, five-second period stages were used to control the pneumatic steam valve 314. By energizing the second solenoid 311 one time, the pneumatic steam valve was opened by one-sixth. If opening the pneumatic steam valve through stage one was not adequate to raise temperatures in the greenhouse, the second solenoid 311 was again energized and more air was bled off so steam passes into the heater 36 at a faster rate. When the temperature had reached the desired set-point, the first solenoid 310 was again energized pressuring the pneumatic line and shutting the pneumatic valve 314 off. This process was repeated as needed.

Cooling System

Figure 4:
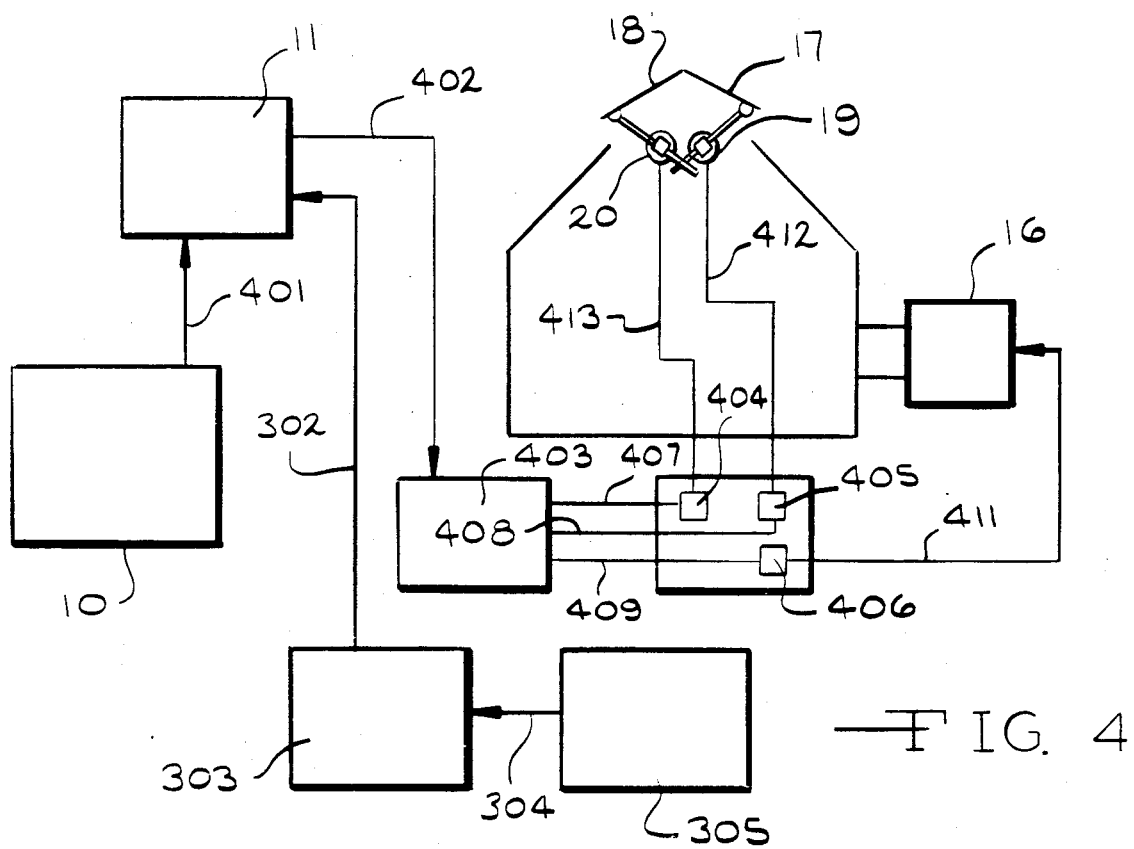
FIG. 4 is a schematic view of the cooling system for each greenhouse.

As shown in FIG. 4, the cooling system consisted of eight basic components. These components included the microcomputer 10, the microprocessor 11, the MUX card 303, which read the temperature sensors 305, the TRIAX card 403 which energized larger mechanical relays 404, 405, which in turn energized vent 17 and 18 motors 19 and 20 and optionally via mechanical relay 406 and line 411 an evaporative cooler 16. A cooling temperature set-point was transmitted from the microcomputer 10 to the microprocessor 11 via connector 401. The microprocessor 11 read the MUX card 303 via connector 302 which read the temperature sensor 305 via connector 304. If the temperature in the section 14 of greenhouse 12 was above the cooling set-point, the microprocessor 11 energized solid state relays (not shown) in the TRIAX card 403 through connectors 402, 407, 408 and 409. One of the solid state relays in card 403 in turn energized the larger relays 404 and 405 which controlled either the vent motors 19 and 20 or relay 406 to the evaporative cooler 16.

The vents 17 and 18 were opened in thirteen stages by motors 19 and 20. If the temperature still had not been controlled after the vents 17 and 18 are wide-open (as shown in FIG. 4), the evaporative cooler 16 was turned on at a predetermined temperature above the set-point. A fan 21 first blows outside air into the greenhouse section. If this still was not adequate to control temperature, then a water pump (not shown) to nozzles 22 was turned on in addition to the fan 21 to wet pads 23 in the cooler 16. This allowed greater cooling due to evaporative cooling. The reverse steps using the cooler 16 and vents 17 and 18 occurred as the temperature dropped.

$CO_2$ ANALYSIS STEM

Figure 5:
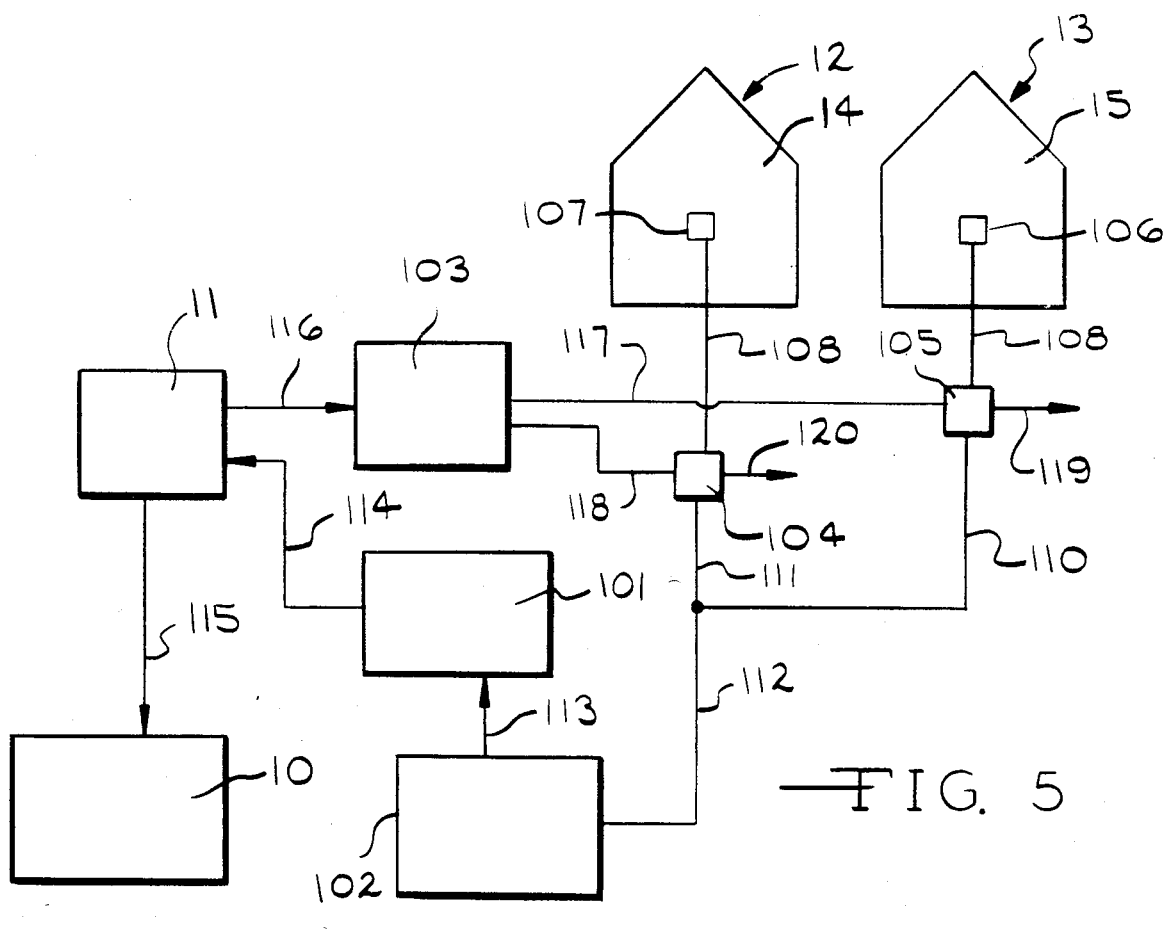
FIG. 5 is a schematic view of the carbon dioxide analysis system for each greenhouse.

The $CO_2$ system as shown in FIG. 5 consisted of seven major components. They included the microcomputer 10, the microprocessor 11, the MUX card 101 which read the $CO_2$ analyzer 102, a TRIAX card 103 which controlled three-way solenoids 104 and 105 and air pumps 106 and 107. $CO_2$ analysis occurs as set forth in the following description.

The small air pump 106 and 107 in each greenhouse section continually pumped air via lines 108 to three-way solenoids 104 and 105. In the normal off position of each solenoid 104 and 105, the air was purged to the atmosphere via lines 119 and 120. When a particular greenhouse 12 or 13 section 14 or 15 was to be analyzed for $CO_2$ concentration, the solenoid 104 or 105 was energized by connectors 116 and 117 or 116 and 118. When energized, the air no longer passed into the atmosphere, but followed an air line 110 and 112 or 111 and 112 to the $CO_2$ analyzer 102. The solenoid 104 or 105 was energized for a period long enough to allow the air to reach the $CO_2$ analyzer 102 and be measured. By staging through the three-way solenoids 104 and 105 in sequence, one could use one $CO_2$ analyzer to analyze many greenhouse 12 and 13 sections 14 and 15 sequentially.

A millivolt output was ready by the MUX card 101 and through connection 113 was converted into a digital number by the microprocessor 11 through connection 114. The microprocessor 11 then stored that number in memory until retrieved by the microcomputer 10 through connector 115 which converted it into a measured $CO_2$ concentration.

$CO_2$ ENRICHMENT SYSTEM

Figure 2:
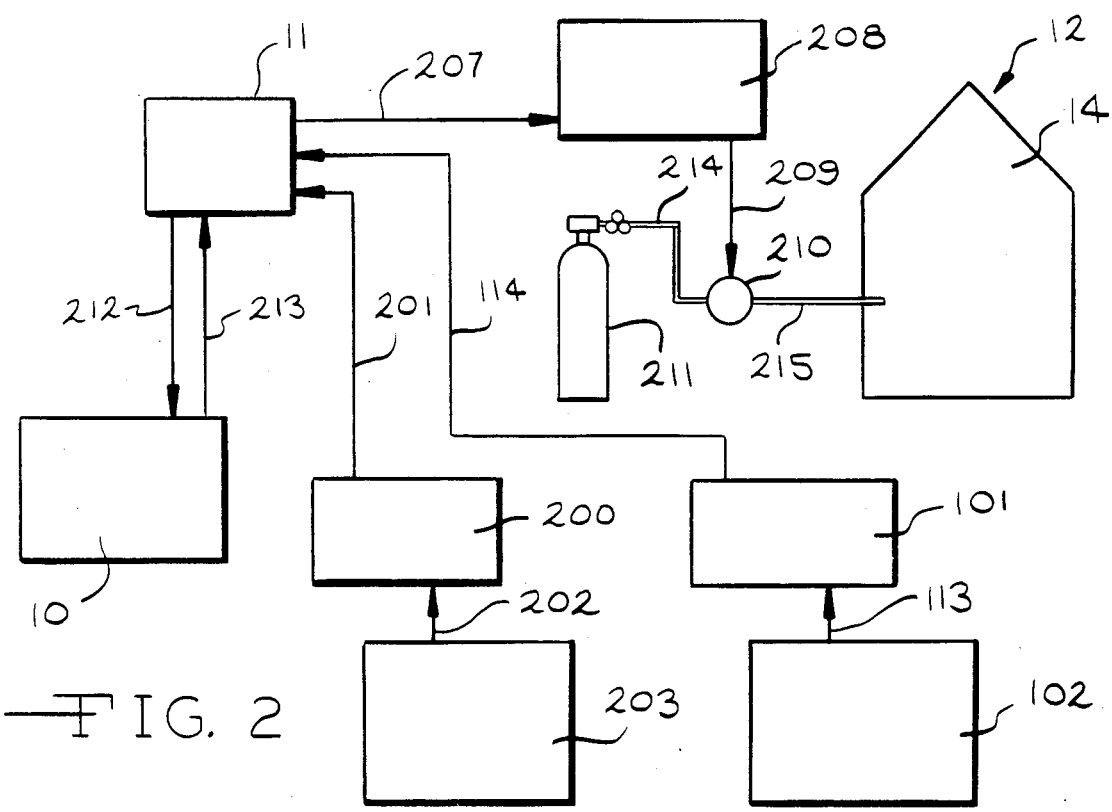
FIG. 2 is a schematic view of the carbon dioxide enrichment system for each greenhouse.

As shown in FIG. 2 the $CO_2$ enrichment system consisted of nine basic components. They included the microcomputer 11, the microprocessor 12, a MUX card 200 which read a light sensor 203, to another MUX card 101 which reads the $CO_2$ analyzer 102, a TRIAX card 208 which energized a solenoid 210, and a $CO_2$ source 211. The microprocessor 11 read the current $CO_2$ concentration and irradiance (both as a raw unconverted number) from the respective MUX cards 200 and 101. These numbers are transmitted to the microcomputer 10 via connecter 212 which calculated the current and desired $CO_2$ concentration for the greenhouse sections 14 and 15. Based upon the current $CO_2$ concentration, the computer calculated the $CO_2$ injection time necessary to elevate or enrich the $CO_2$ concentration in that particular section 14 or 15 to the desired concentration and the injection time per minute necessary to maintain that concentration.

Once calculated, the numbers were transmitted from the microcomputer 10 to the microprocessor 11 via connector 213. The microprocessor 11 then energized solid state relays on the TRIAX card 208 via line 207 which turned on the solenoid valve 210 via connector 209 for $CO_2$ injection into the section 14. The microprocessor 11 timed the injection to enrich the atmosphere in section 14 initially and then subsequently enriched the atmosphere in section 14 on a minute by minute basis to maintain the desired concentration originally calculated. The same method was repeated in section 13.

It will be appreciated that lines 115, 212, 213, 301 and 401 between the computer 10 and microprocessor 11 are a single cable. The Figures show these separate lines in order to show the flow of information.

As can be seen from the foregoing description, the present invention provides a unique method for rapidly growing plants. It is believed to be a significant advance in horticulture.

We claim:

1. A method for the optimization of growth of plants in a greenhouse which comprises:
   (a) providing the greenhouse including windows which allow ambient light exposure on the plants and including vent means for venting the greenhouse to outside air for cooling of an atmosphere in the greenhouse, a heater means for heating the atmosphere, and a dispensing means for providing an increased amount of carbon dioxide in the atmosphere in the greenhouse, wherein the vent means, heater means, and the dispensing means are controlled by a computer as a function of temperature and a measured amount of light in the greenhouse sent to the computer; and
   (b) regulating with the computer the temperature of the atmosphere and the amount of carbon dioxide in the atmosphere as a function of the measured amount of light at a pre-selected atmosphere temperature range in the greenhouse and venting the greenhouse to outside air with the vent means at atmosphere temperatures in the greenhouse above the pre-selected temperature range in day and night cycles until the plant matures, wherein the regulating and venting is controlled by the computer using an equation arrived at from experimental growth data for a particular plant to be grown.

2. The method of claim 1 wherein the pre-selected temperature range is between about 1° C. and 35° C.

3. The method of claim 1 wherein the computer is in a separate area outside the greenhouse and records the amount of light, the temperature and the amount of carbon dioxide in the greenhouse as read through a microprocessor connected to the computer, by sensing means in the greenhouse and wherein the computer through the microprocessor changes the temperature by opening the vent means for cooling or by heating the atmosphere and by increasing the amount of carbon dioxide as a function of the amount of light detected by the light sensing means.

4. The method of claim 3 wherein the amount of carbon dioxide is determined by an analyzer (102) provided with the computer.

5. The method of claim 4 wherein the greenhouse has additional cooling means (21, 22, 23) and wherein the vent means which open and the additional cooling means maintain the temperature of the greenhouse in the pre-selected temperature range.

6. A method for the optimization of growth of plants in a greenhouse which comprises:
 (a) providing the greenhouse including windows which allow ambient light exposure on the plants and including vent means for venting the greenhouse to outside air for cooling of an atmosphere in the greenhouse, a heater means for heating the atmosphere and a dispensing means for providing an increased amount of carbon dioxide in the atmosphere in the greenhouse, wherein the vent means, the heater means and the dispersing means are controlled by a computer as a function of the temperature and a measured amount of light in the greenhouse sent to the computer; and
 (b) regulating the temperature of the atmosphere with the vent means and the heater means and the amount of carbon dioxide with the dispersing means as a function of a pre-selected atmosphere temperature between about 1° C. and 35° C. according to equations written in Basic computer language:

$$C=((((J*B)+(J*H*L))/(2*F))-D-(I*L))$$
$$((2*G)-((J*J)/(2*F)))$$

$$T=(-B-(H*L)-(J*C))/(2*F)$$

wherein C and L are converted to log form to the base 10 and C is the concentration of carbon dioxide is in parts per million and T is the temperature and wherein L is light in micromols sec$^{-1}$ meter$^{-2}$ in the 400–700 nanometer waveband and wherein B, D, F, G, H, I and J are experimentally derived values in the ranges:
B: −8.14 to −1.44
D: 32.15 to 96.45
F: −0.48 to −0.04
G: −29.88 to 18.39
H: 0.45 to 2.58
I: 3.26 to 22.85
J: 1.16 to 1.95
and venting the greenhouse for cooling above the pre-selected temperature range in day and night cycles until the plants mature wherein the regulating and venting is controlled by the computer using the equation arrived at from experimental growth data for the particular plant to be grown.

7. The method of claim 6 wherein the constants B, D, F, G, H, I and J are:
B: −4.79
D: 64.30
F: −0.079
G: −22.98
H: 1.52
I: 13.06
J: 1.56.

8. The method of claim 6 wherein the plants are flowering.

9. The method of claim 6 wherein the plants are chrysanthemums.

10. The method of claim 6 wherein the computer is connected through a microprocessor and relay controlled valves to a supply means for supplying carbon dioxide to the atmosphere in the greenhouse and wherein the computer and microprocessor are connected to the vent means through motors for opening the vent means in stages and the heater means through valves for changing the temperature in the greenhouse, and wherein the temperature and amount of carbon dioxide is determined by sensing means in the greenhouse connected to the computer through the microprocessor.

11. An apparatus for optimization of the growth of plants which comprises:
 (a) a greenhouse including windows which allow ambient light exposure on plants and including automatically controlled vent means for venting and thus cooling an atmosphere in the greenhouse with outside air;
 (b) automatically controlled heater means which increases the temperature of the atmosphere in the greenhouse;
 (c) automatically controlled dispensing means leading into the greenhouse for providing carbon dioxide in the atmosphere in the greenhouse;
 (d) light, temperature and carbon dioxide sensing means for measuring an amount of light falling on the plants and for measuring the temperature and amount of carbon dioxide in the greenhouse; and
 (e) control means including a computer connected to a microprocessor connected to the vent means, dispersing means and heater means which automatically regulates the temperature of the atmosphere and the amount of carbon dioxide in the atmosphere as a function of the temperature and the amount of light sent to the computer through the microprocessor at a pre-selected temperature range of the atmosphere and which vents the greenhouse to outside air at temperatures above the pre-selected temperature range in day and night cycles until the plant matures wherein the computer is controlled by an equation arrived at from experimental growth data for the particular plant to be grown and wherein automatic regulation and venting are controlled by the computer.

12. The apparatus of claim 11 wherein the pre-selected temperature range is between about 1° and 35° C.

13. The apparatus of claim 11 wherein the computer which detects the measured amount of light, amount of carbon dioxide and temperature through the microprocessor and sensors and wherein the computer through the microprocessor adds carbon dioxide to and raises or lowers the temperature of the atmosphere in the greenhouse using the heater means or the vent means as a function of the amount of light at least in the pre-selected temperature range.

14. The apparatus of claim 13 wherein the greenhouse includes added cooling means (16) and wherein the vent means and added cooling means can maintain the temperature in the vented greenhouse.

15. The apparatus of claim 14 wherein the added cooling is a fan (21) with pads (23) for evaporative cooling with water supplied through nozzles (22).

16. The apparatus of claim 12 wherein the computer controls the greenhouse according to equations written in Basic computer language $$C = \frac{((((J*B)+(J*H*L))/(2*F))-D-(I*L))}{((2*G)-((J*J)/(2*F)))}$$

$$T = (-B-(H*L)-(J*C))/(2*F)$$

wherein C and L are converted to log form to the base 10 and C is the concentration of carbon dioxide in parts per million (ppm), wherein L is the light in micromoles $sec^{-1}$ $meter^{-2}$ in the 400 to 700 nanometer wave band and T is the temperature in °C. and wherein B, D, F, G, H, I and J are experimentally derived values in the ranges:

B: $-8.14$ to $-1.44$
D: 32.15 to 96.45
F: $-0.48$ to $-0.04$
G: $-29.88$ to 18.39
H: 0.45 to 2.58
I: 3.26 to 22.85
J: 1.16 to 1.95 at atmosphere temperatures in the pre-selected temperature range and which vents the greenhouse for cooling above the pre-selected temperature range in cycles day and night until the plants have matured.

17. The apparatus of claim 16 wherein the constants B, D, F, G, H, I and J are:

B: $-4.79$
D: 64.30
F: $-0.079$
G: $-22.98$
H: 1.52
I: 13.06
J: 1.56.

18. A method for the optimization of growth of plants in a greenhouse or other protected area which comprises:

(a) providing a protected area with windows which allows light exposure on the plants and including vent means for venting the area to outside air for cooling of an atmosphere in the area, a heater means for heating the atmosphere, and a dispensing means for providing an increased amount of carbon dioxide in the atmosphere in the area, wherein the vent means, heater means, and the dispensing means are controlled by a computer as a function of the temperature and a measured amount of light in the area sent to the computer; and (b) regulating with the computer the temperature of the atmosphere and the amount of carbon dioxide in the atmosphere as a function of the measured amount of light at a pre-selected atmosphere temperature range in the area and venting the area to outside air with the vent means at atmosphere temperatures in the area above the pre-selected temperature range in day and night cycles until the plant matures, wherein the regulating and venting is controlled by the computer using an equation arrived at from experimental growth data for a particular plant to be grown.

19. The method of claim 18 wherein the pre-selected temperature range is between about 1° C. and 35° C.

20. An apparatus for optimization of the growth of plants which comprises:

(a) a protected area with windows which allows light exposure on plants and including automatically controlled vent means for venting and thus cooling an atmosphere in the area with outside air;

(b) automatically controlled heater means which increases the temperature of the atmosphere in the area;

(c) automatically controlled dispensing means leading into the area for providing carbon dioxide in the atmosphere in the area;

(d) light, temperature and carbon dioxide sensing means for measuring an amount of light falling on the plants and for measuring the temperature and amount of carbon dioxide in the area; and (e) control means including a computer connected to a microprocessor connected to the vent means, dispersing means and heater means which automatically regulates the temperature of the atmosphere and the amount of carbon dioxide in the atmosphere as a function of the amount of light sent to the computer through the microprocessor at a pre-selected temperature range of the atmosphere and which vents the area to outside air at temperatures above the pre-selected temperature range in day and night cycles until the plant matures, wherein the computer is controlled by an equation arrived at from experimental growth data wherein the regulation and venting are controlled by the computer.

21. The apparatus of claim 20 wherein the preselected temperature range is between about 1° and 35° C.

* * * * *